Jan. 31, 1956  R. E. PETERSON ET AL  2,732,697
SMOKER'S LIGHTER
Filed Sept. 26, 1949  6 Sheets-Sheet 3

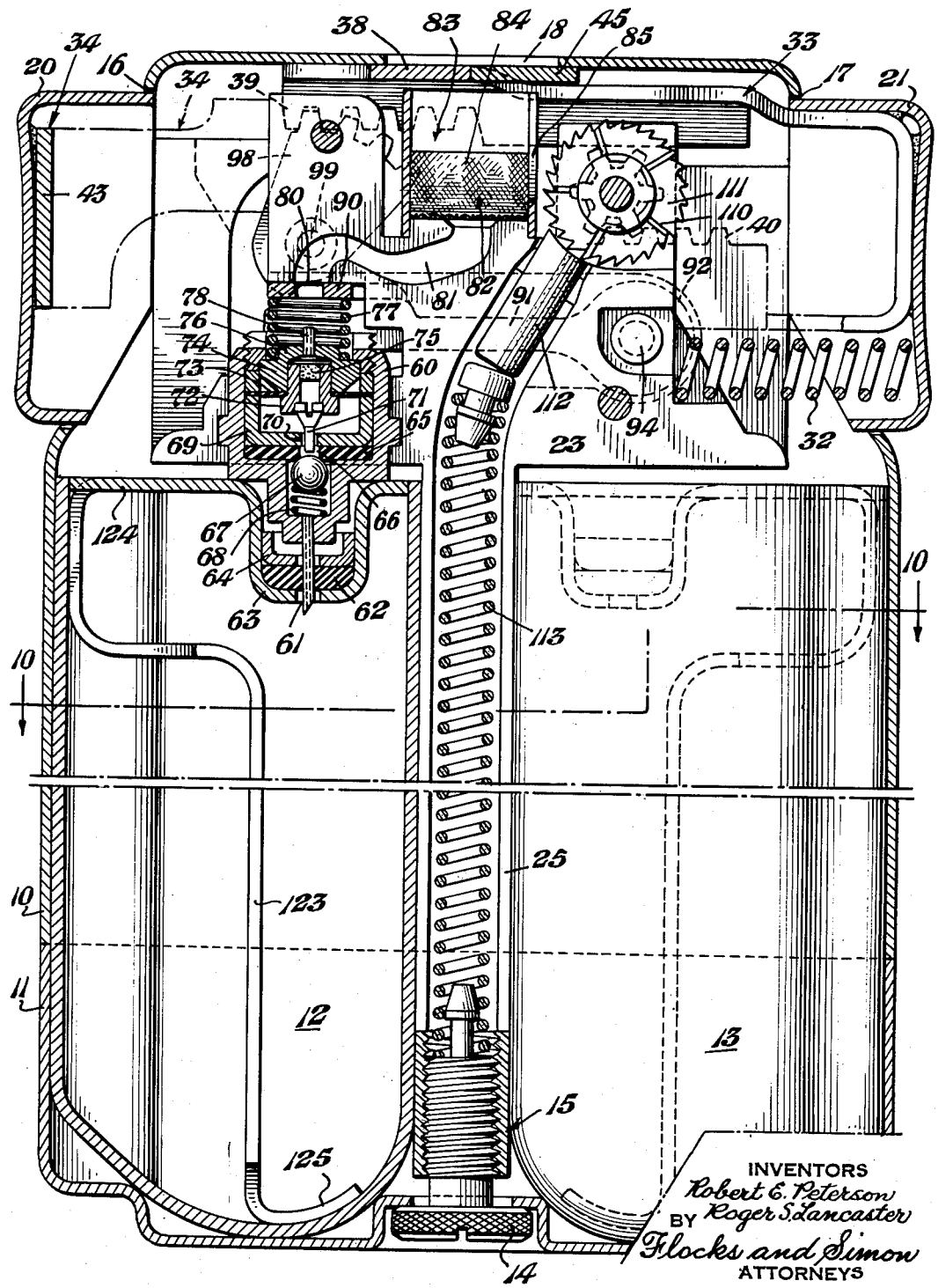

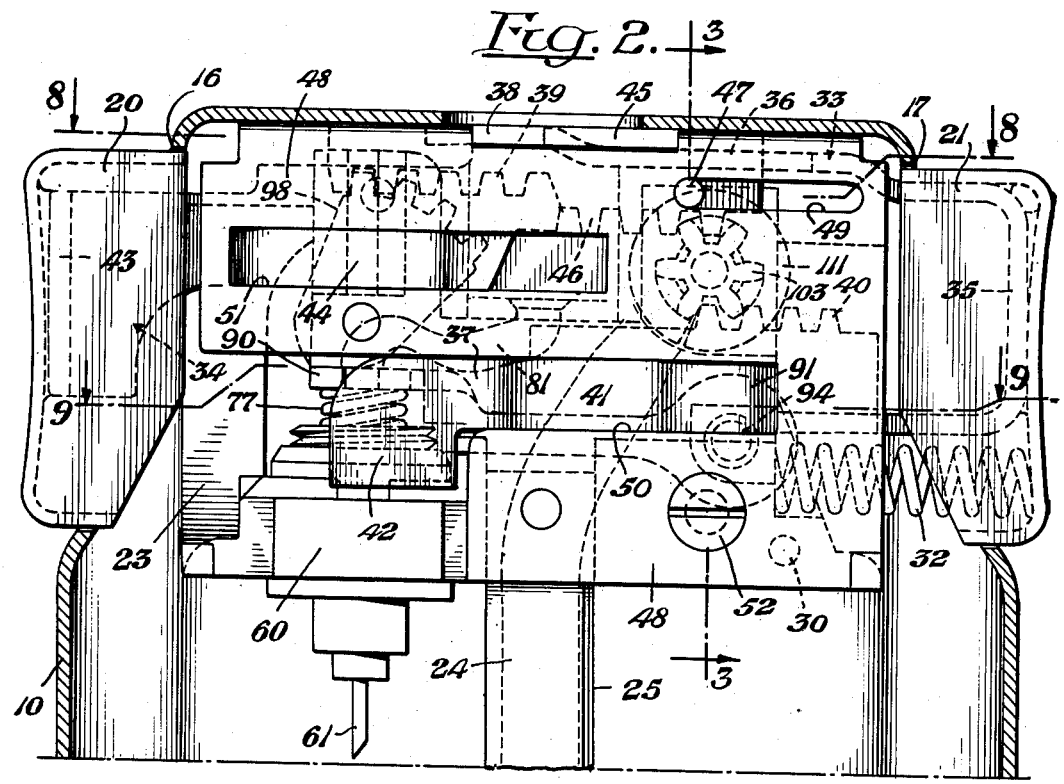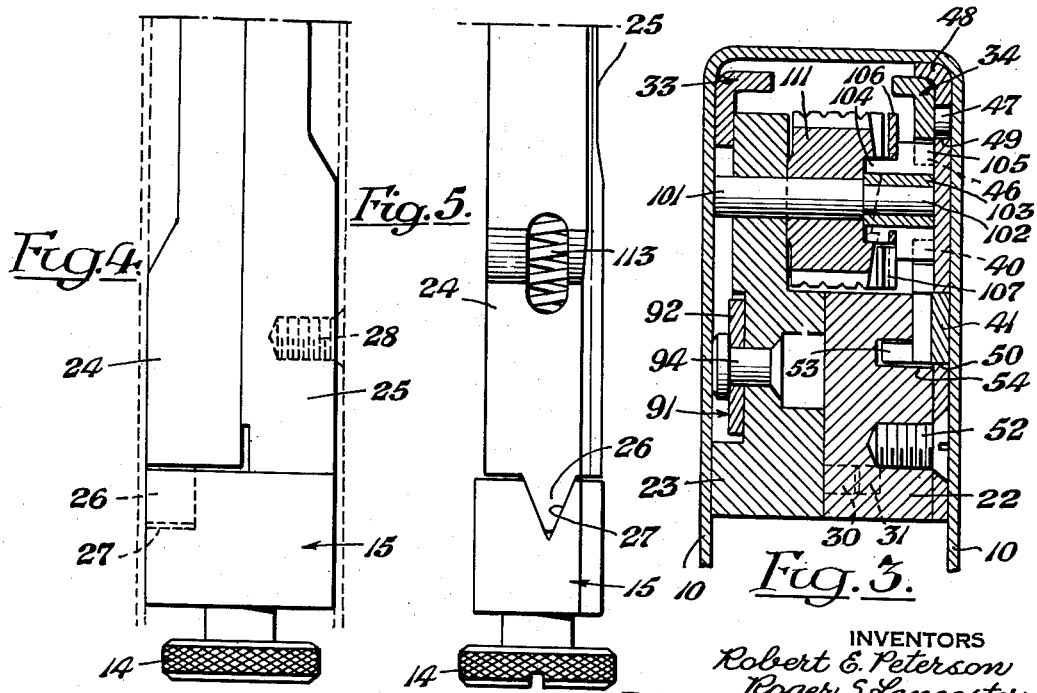

INVENTOR
Robert E. Peterson
Roger S. Lancaster
BY Flocks and Simon
ATTORNEYS

Jan. 31, 1956  R. E. PETERSON ET AL  2,732,697
SMOKER'S LIGHTER
Filed Sept. 26, 1949  6 Sheets-Sheet 4

INVENTORS
Robert E. Peterson
Roger S. Lancaster
BY Flocks and Simon
ATTORNEYS

Jan. 31, 1956   R. E. PETERSON ET AL   2,732,697
SMOKER'S LIGHTER
Filed Sept. 26, 1949   6 Sheets-Sheet 5
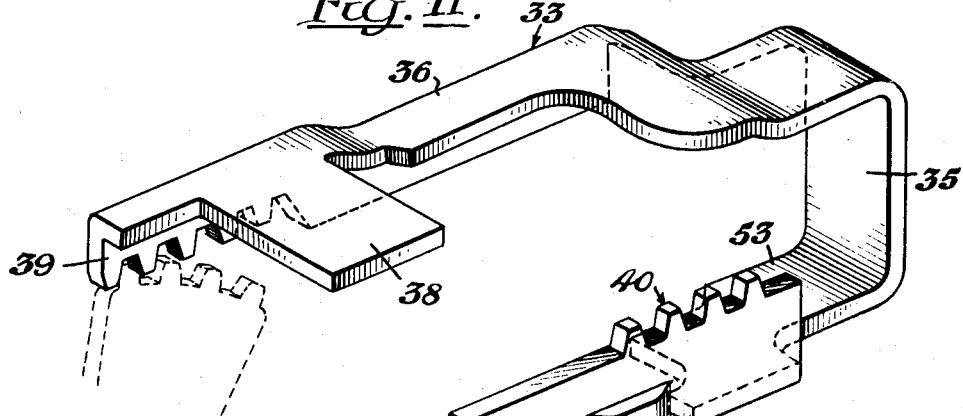
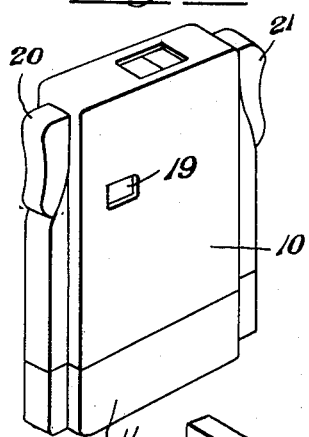
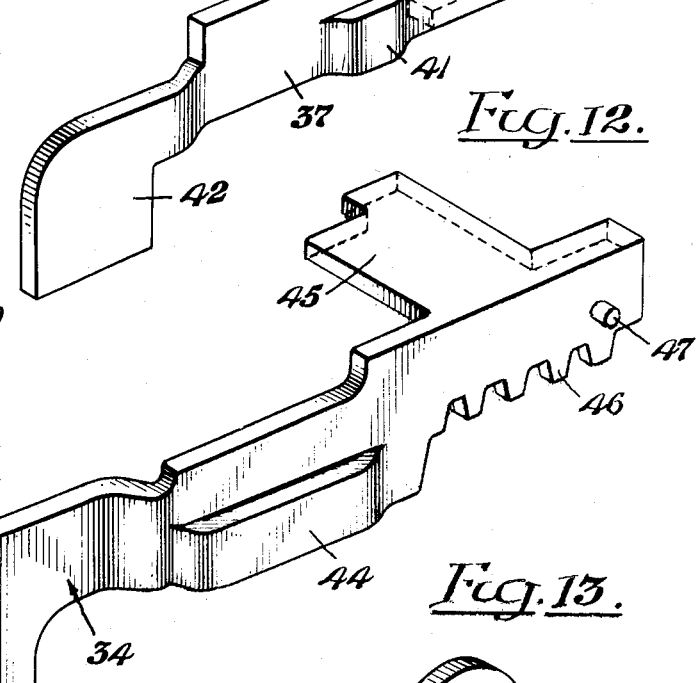
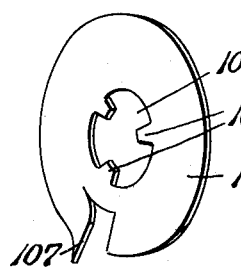
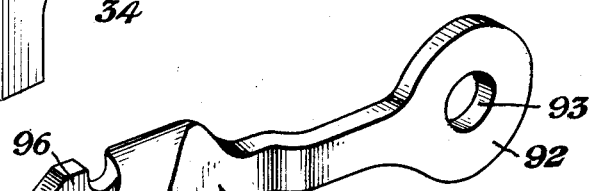
INVENTORS
Robert E. Peterson
Roger S. Lancaster
By Flocks and Simon
ATTORNEYS Jan. 31, 1956   R. E. PETERSON ET AL   2,732,697
SMOKER'S LIGHTER
Filed Sept. 26, 1949   6 Sheets-Sheet 6
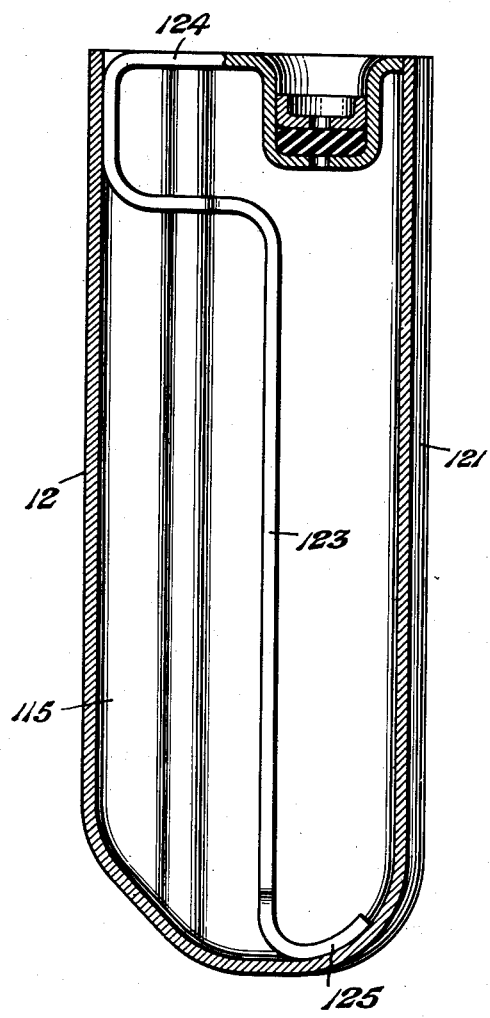
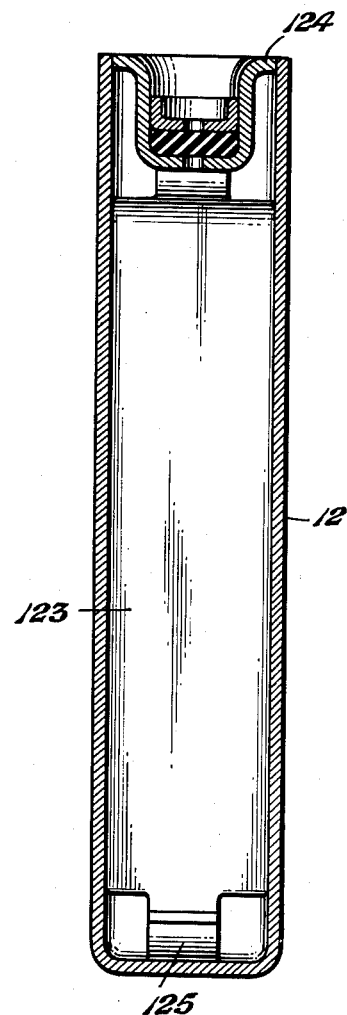
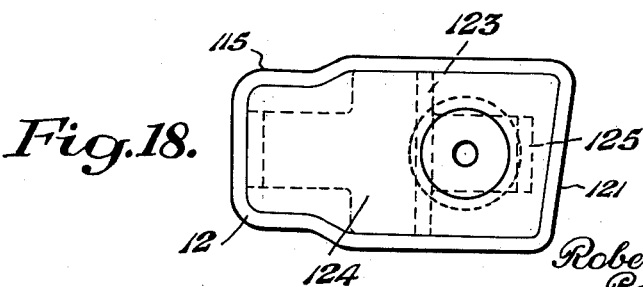
INVENTORS
Robert E. Peterson,
Roger S. Lancaster
BY Flocks and Simon
ATTORNEYS

United States Patent Office 2,732,697
Patented Jan. 31, 1956

2,732,697

SMOKER'S LIGHTER

Robert E. Peterson, New York, N. Y., and Roger S. Lancaster, Waterbury, Conn., assignors to Repeter Products, Inc., New York, N. Y., a corporation of New York Application September 26, 1949, Serial No. 117,844

13 Claims. (Cl. 67—7.1)

The present invention relates to a lighter. More particularly the present invention relates to a portable lighter of a type especially suitable for the proper and efficient combustion of a gaseous fuel.

In co-pending application Serial No. 553,701, filed September 12, 1944, issued as U. S. Patent No. 2,482,794 on September 27, 1949, to Robert E. Peterson, there is disclosed a lighter capable of efficiently burning a gaseous fuel such as liquid propane, butane or suitable mixtures thereof. The lighter disclosed in the aforementioned application includes as one of its features a carbureting device for intimately admixing the gaseous fuel with air to form a combustible mixture, a mixing chamber and a combustion chamber, together with a suitable igniting mechanism.

It is one of the objects of the present invention to provide an easily assembled lighter of the character described provided with a minimum of operating parts and positive in action.

A second general object of the present invention is to provide a direct action, gas fueled lighter provided with a valve structure operated in proper timed relation to an igniting mechanism.

A third object of the present invention is to provide a novel lighter including a two part supporting structure for the various operating members facilitating the rapid assembly thereof.

A fourth object of the present invention is to provide a gas fueled lighter having a portion thereof forming a guide for insuring the proper assembly therewith of a gas fuel cartridge.

A fifth object of the present invention is to provide a novel cartridge for liquefied gas fuel such as propane, butane and/or mixtures thereof.

Other objects and the nature and advantages of the instant invention will be apparent from the following description taken in conjunction with the accompanying drawings, wherein:

Fig. 1 is a vertical section of the lighter of the present invention;

Fig. 2 is an elevation of the upper portion of the lighter with the casing shown in section;

Fig. 3 is a section taken generally along the line 3—3 of Fig. 2;

Fig. 4 is a side view of the lower end of the flint spring guide tube;

Fig. 5 is a front view of the lower end of the flint spring guide tube;

Fig. 11 is a perspective enlarged deatil view of one of the operating members;

Fig. 12 is a view similar to Fig. 11 of the other of the operating members;

Fig. 13 is an enlarged perspective detail view of the gas valve operating lever;

Fig. 14 is an enlarged perspective detail view of the clutch disc and integral pawl for rotating the flint wheel;

Fig. 15 is a perspective view of the lighter;

Fig. 16 is a vertical section of a novel cartridge or gas receptacle forming a part of the lighter;

Fig. 17 is a vertical section taken at 180° from the section of Fig. 16; and

Fig. 18 is a top plan view of the cartridge of Figs. 16 and 17.

Figure 7:
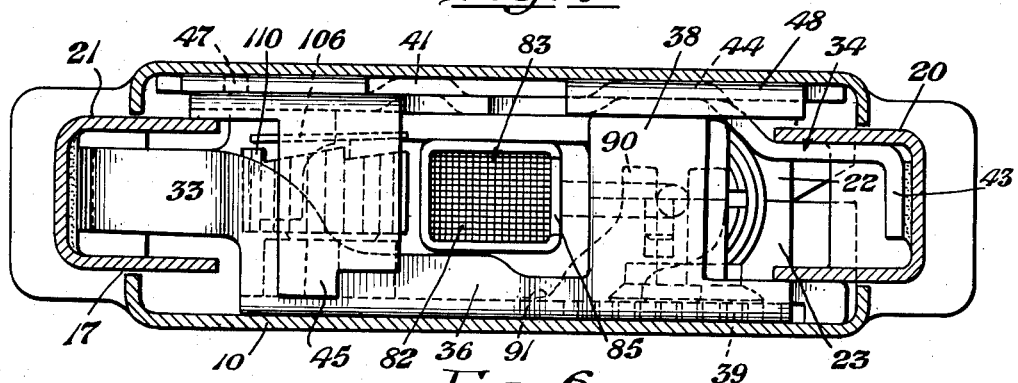
Fig. 7 is a section taken generally along the line 7—7 of Fig. 6.

Referring to the figures of the drawings and particularly Fig. 1 thereof, the lighter of the present invention includes an upper casing member 10 and a lower casing member or cover 11. Firmly fitted within the upper casing member 10 are a pair of fuel cartridges to be hereinafter described in detail and indicated by the reference numerals 12 and 13. The cartridges 12 and 13 project from the upper casing member 10 at their lower ends and fitted over these lower ends is the lower casing member 11 held in position by the screw 14. The screw 14 is threaded into the lower end of the flint guide tube 15.

Figure 9:
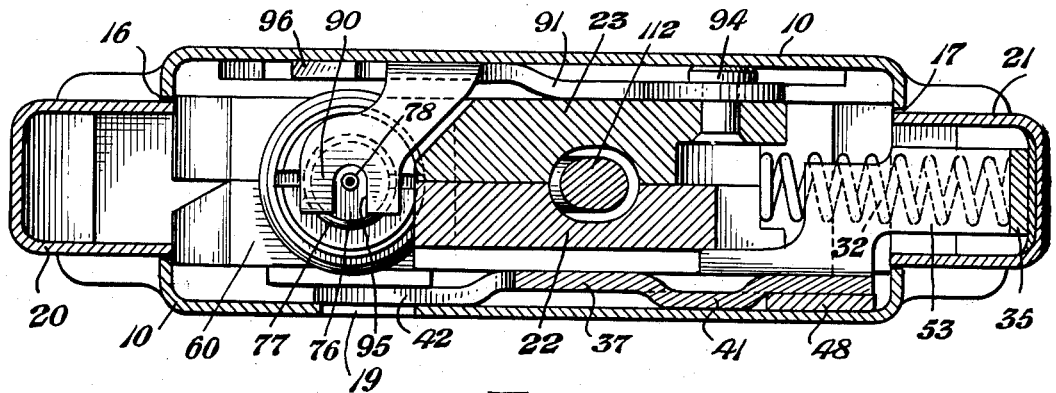
Fig. 9 is a section taken on the line 9—9 of Fig. 2.

The upper end of the casing member 10 is provided at each edge with opposed openings 16 and 17. The top of the casing member 10 is also provided with a combustion opening 18 and one of the sides with an air vent opening 19 (see Figs. 9 and 15). Slidably fitted into the openings 16 and 17 are a pair of push buttons 20 and 21 respectively, which serve to operate the lighter, as will be hereinafter described in detail.

Within the casing member 10 there is provided a frame or block composed of two main members 22 and 23. The members 22 and 23 are each provided with a dependent portion, the member 22 being provided with a dependent portion 24 and the member 23 with a dependent portion 25, these two members together making up the flint guide tube 15 previously described. As best shown in Figs. 4 and 5, the lower end of the member 24 is provided with a wedge portion 26 which fits into a V notch 27 in the member 25 to hold the lower end of the members together in proper index. A screw 28 is provided which extends through the upper casing member into the extended portion 25 in order to aid in properly positioning the member 25 and the back frame member 23 that the member 25 extends from. The members 22 and 23 are held together by suitable pins, as for example the pin 30 extending from the member 23 into a socket 31 in the member 22. As will be hereinafter described in detail, substantially all of the working parts of the lighter herein described are supported from the two block members or frame members 22 and 23.

Referring once again to Figs. 1 and 2, it will be noted that the push button 21 is normally forced outwardly of the casing by a spring 32 which bears against the inside of the push button on its outer end and the supporting block 23 on its inner end. Each of the push buttons 21 and 20 is suitably soldered or welded to a respective actuating member 33 and 34, respectively. As best shown in Figs. 11 and 12, the actuating member 33 is provided with a vertically disposed flat portion 35 which is joined to the push button 21 as previously described, and upper leg 36 and lower leg 37. The upper leg 36 includes a combustion port closure member 38 and a downwardly dependent rack 39. The lower leg 37 includes an upwardly extending rack 40, a laterally extending stamped-out guide portion 41 and a downwardly extending closure member 42 for closing the air vent 19.

The operating member 34 includes a vertically extending portion 43 suitably soldered or welded to the push button 20, a laterally extending stamped-out guide portion 44, a closure member 45 which is adapted to cooperate with the closure member 38 to close the combustion port 18 and a downwardly extending rack 46.

Figure 8:
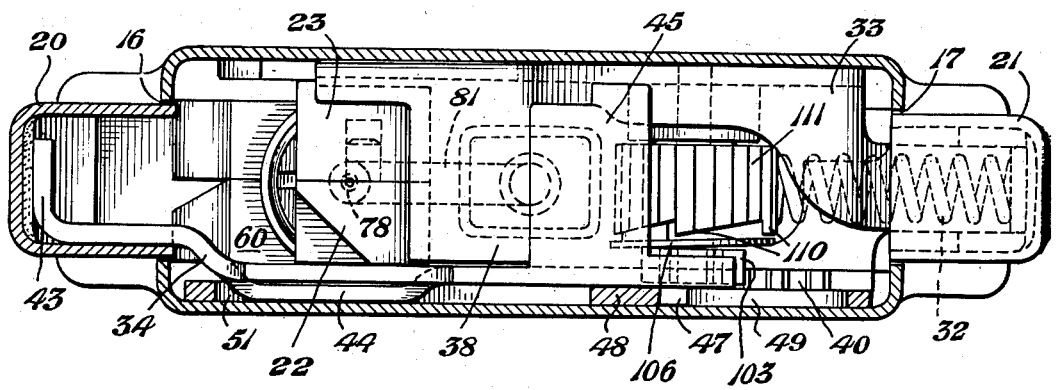
Fig. 8 is a section similar to Fig. 7 but taken generally on the line 8—8 of Fig. 2 showing the parts in their inactive position.

The operating member 34 is also provided with a guide pin 47. The operating members 33 and 34 are suitably guided for positive straight-line sliding movement by a guide plate 48 (Fig. 3) provided with a guide slot 49 for the pin 47, a second guide slot 50 for the guide portion 41 and a third guide slot 51 for the guide member 44 (Fig. 8). The guide plate 48 is suitably fastened to the block or frame member 22 as by the screw 52. It will also be noted that the member 33 has one of the legs 53 extending from the vertical portion 35 fitted into and guided by a slot 54 in the frame member 22.

Figure 6:
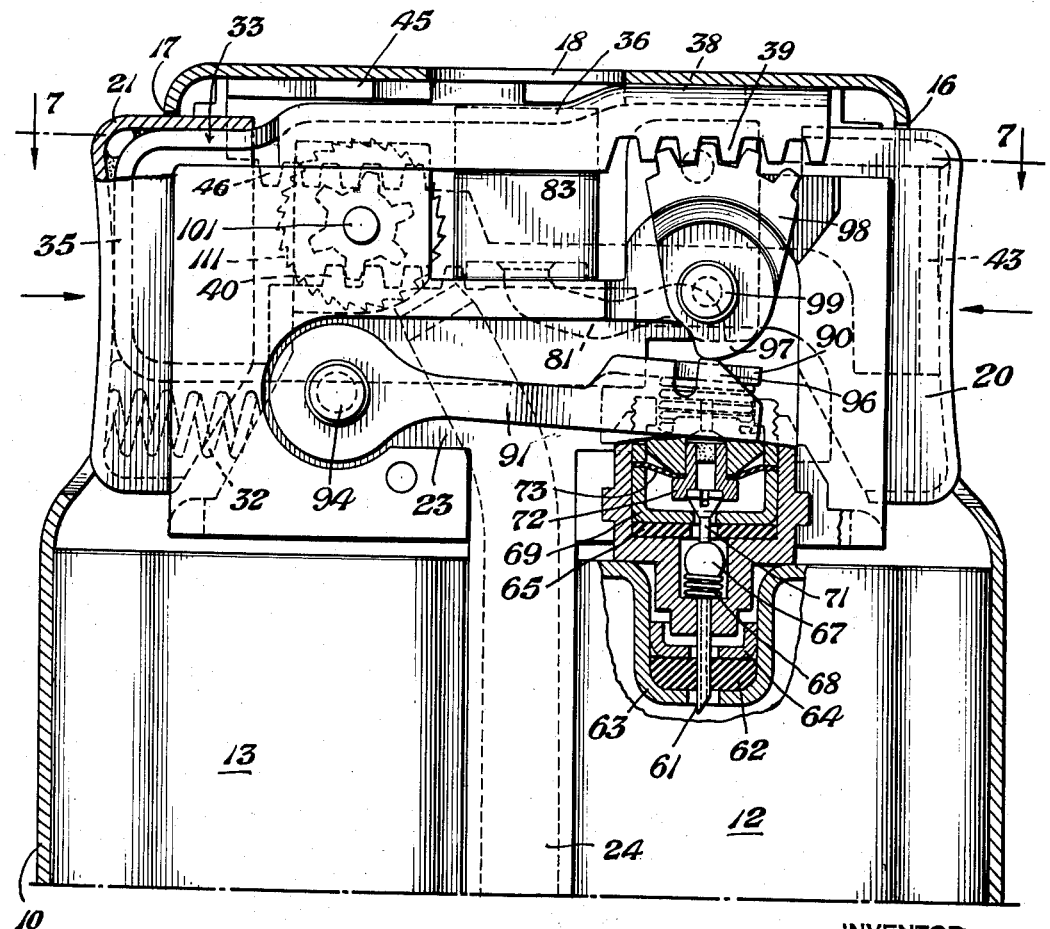
Fig. 6 is a side view partly in section of the mechanism shown in Fig. 1 taken from the opposite side with the gas valve in open position.

Referring to Fig. 1, it will be noted that a valve housing 60 is received and fitted into the block members 22 and 23. The housing 60 is provided at its lower end with a hollow needle 61 for piercing a sealable disc 62 fitted into a well 63 in the upper end of the cartridge 12. The sealable disc 62 is held in position in the well 63 as by a cup 64. The valve housing 60 is also provided with a gasket 65 having an opening 66 therein normally sealed by a ball 67 urged against the gasket 65 by spring 68. Positioned above the gasket 65 and retaining the same in position within the housing 60 is a cup 69 provided with an opening 70 to receive a valve stem 71. The valve stem 71 is carried by a bushing 72 extending through a diaphragm 73. The bushing 72 is firmly fastened to the diaphragm by member 74 fitted over an extended end of the bushing 72. The bushing also carries a filter member 75 therewithin. The upper end of the member 74 is provided with a projecting portion 76 extending into an actuating spring 77. A jet tube 78 is also provided extending upwardly from the member 74 and communicating with the interior of the bushing 73 through the filter member 75. As best shown in Fig. 6, movement of the spring 77 downwardly will move the member 74 downwardly and bend the diaphragm 73 to cause the stem 71 to push the ball 67 downwardly and permit passage of gas around the ball to open the valve. Actuation, however, of the member 74 through the spring 77 will permit the diaphragm to force the member 74 upwardly if the pressure beneath the diaphragm becomes excessive, thus seating the ball 67 to cut off passage of gas. The thus described arrangement, therefore, functions both as a valve and as a pressure regulator.

Positioned in alignment with the end of the jet tube 78 is the lower end 80 of a tortuous passage 81 which receives a mixture of gas and air drawn into the opening 80 by the high speed gas issuing from the jet 78. The gas and air mixture which is further mixed within the tortuous passage 81 is fed through a screen 82 into a combustion chamber 83. The screen 82 is of a general U shape provided with side flanges, as for example the flange 84 snugly fitted within the combustion chamber 83. One of the open ends of the screen 82 faces the opening 85 in the combustion chamber wall for the entrance of an igniting spark and the open top of the combustion chamber 83 communicates with the combustion opening 18 when the closure members 38 and 45 are moved to open position.

Referring to Figs. 1 and 6, it will be noted that a foot 90 is provided which overlies the upper end of the spring 77. The foot 90 projects from a valve operating lever 91 which is shown in detail in Fig. 13. The end of the lever 91, remote from the foot 90, is provided with a pivot portion 92 having an opening 93 therein for receiving a stud 94 fastened to the frame or block member 23 (Fig. 3). The foot 90 of the lever 91 is also provided with a notch 95 so as to promote unhindered passage of gas from the jet tube 78 into the opening 80. Adjacent the foot 90 the valve lever 91 is also provided with a cam follower portion 96 which cooperates with a cam 97 forming a part of a gear sector 98 pivoted as by a stud 99 to the frame member 23. The gear sector 98 meshes with the previously described rack 39 on the operating member 33, and, as shown in Fig. 6, the rack 39 has been moved to the right as the push button 21 has been moved inwardly so that the gear sector 98 has been rotated in clockwise direction to force the lever 91 downwardly about its pivot so that the foot 90 thereof has forced the spring 77 downwardly to open the valve.

Extending from the frame member 23 is a shaft 101 having a reduced end 102 at one end thereof. Journaled for rotation on the reduced end 102 is a pinion 103 provided with a reduced toothed portion 104 and a larger toothed portion 105. Mounted on the reduced toothed portion 104 is a clutch disc 106, best shown in Fig. 14. The clutch disc 106 is provided with a flexible pawl 107 extending outwardly from the general plane thereof and with a central opening 108. Extending into the central opening 108 are a plurality of keys 109 which are adapted to mesh with the toothed portion 104 so that the clutch disc 106 will be rotated with the pinion 103. The larger toothed portion 105 of the pinion 103 is adapted to mesh with the rack 46 on the operating member 34 as well as the rack 40 on the operating member 33, both of these racks producing a clockwise movement of the pinion, as shown in Figs. 1 and 2. The clutch disc 106 will be rotated along with the pinion 103 at this time and the pawl 107 will engage one of the teeth 110 of a ratchet formed in the face of the flint wheel 111, the flint wheel 111 being mounted for rotation on the previously described shaft 101. This rotation of the flint wheel 111 will abrade the flint 112 to furnish an igniting spark to the combustion chamber 83. The flint 112 is urged against the flint wheel 111 by the conventional flint spring 113 housed in the flint guide tube 25 previously described.

Figure 10:
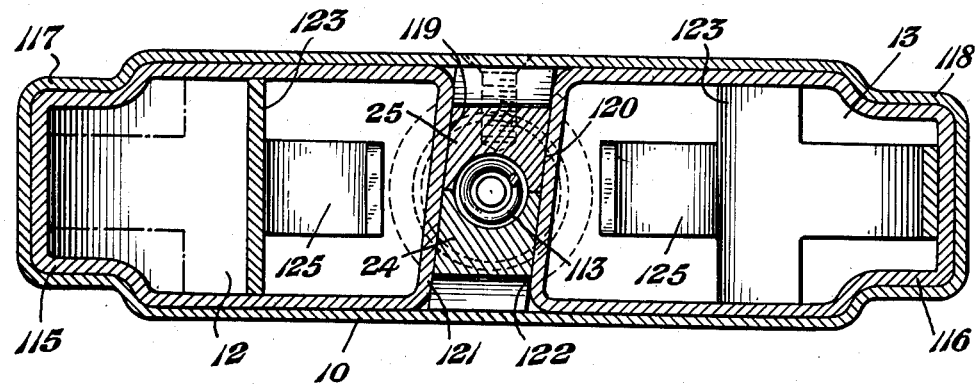
Fig. 10 is a section taken generally along the line 10—10 of Fig. 1.

Referring specifically to Fig. 10 and Figs. 16, 17 and 18, it will be noted that the cartridges 12 and 13 are provided with reduced guide portions 115 and 116 along one of their edges. These guide portions cooperate with corresponding reduced portions 117 and 118 of the upper lighter casing member 10 to insure that when the cartridges are slid into the casing member they will be properly positioned. In addition the two parts 24 and 25, forming the flint guide tube, are provided as shown in Fig. 10 with the slanting faces 119 and 120 which cooperate with the similar angular edges 121 and 122 of the cartridges 12 and 13, respectively. This arrangement makes it impossible to slide the cartridges into the lighter in any but the correct position and insures proper alignment of the needle 61 with the well 63 and the proper portion of the sealing disc 62. The cartridges are also provided with suitable reinforcing members such as the members 123 and 124. It will be noted that the reinforcing members, such as the member 123 extends downwardly from the top portion 124 and is integral therewith. The reinforcing portion 123 is also provided with a laterally extending foot 125 so that the entire cartridge 12, with the exception of the sealing disc 62 and cap 63, is formed from two pieces of a suitable metal welded or otherwise suitably fastened together.

*Operation*

The lighter of the present invention is operated by manually moving the push buttons 20 and 21 inwardly simultaneously as indicated by the arrows in Fig. 6. This movement of the push button 20 similarly moves the operating member 34 while the movement of the push button 21 simultaneously moves the operating member 33. As shown in Fig. 6, the movement of the operating member 33 rotates the gear sector 98 in a clockwise direction due to the meshing of the gear sector 98 with the rack 39. This movement causes the cam 97 to move the portion 96 of the lever 91 downwardly, simultaneously moving the foot 90 downwardly to compress the valve spring 77. This action of the valve spring moves the member 74 downwardly and, therefore, moves the diaphragm 73 from the position of Fig. 1 to the position of Fig. 6. The ball 67 is thereby displaced from its seating position against the gasket 65 allowing gas to flow through the needle 61 and around the ball to the interior of the bushing 72 through the filter plug 75 and the jet 78. This rapid flow of gas through the jet 78 includes a flow of air through the convolutions of the spring 77 and above the spring 77 along with the gas into the opening 80. This initial mixture of gas and air is further mixed in the tortuous pasasge 81 and is also retarded and forced to undergo a more thorough mixing as it passes through the screen 82.

Simultaneously with the movement of the gear sector 98 by the rack 39 the rack 40 simultaneously starts to rotate the ignition pinion 103. The rack 40 is assisted in this action by the rack 46 which also rotates the pinion from the upper side thereof. The flint wheel 111 is, therefore, rotated in a clockwise direction, as shown in Fig. 1, to produce a spark by abrasion of the flint 112. This action, however, occurs at a slightly later point in the cycle of operation than the opening of the gas valve previously described so that prior to the production of the spark a combustible mixture of gas and air is present in the combustion chamber 83.

It is also to be noted that the movement of the operating members 33 and 34 also moves the closure members 38 and 45 to uncover the combustion port 18 and at the same time moves the closure member 42 to a position to uncover the air port 19 which is located adjacent the jet 78 so as to supply air from carburetion at this point.

The cartridge 12 is preferably filled with a liquefied gas such as propane, butane or suitable admixtures thereof. When the gas in the cartridge 12 is exhausted, the cartridge 12 can be removed and the spare cartridge 13 turned about so as to fit the slanting surface 119 as well as the guide portion 117 of the casing, and the cartridge may then be moved into the casing in perfect alignment with the needle 61. The sealing disc 62 is preferably formed of a suitable material readily pierced by the needle 61 and self-sealing about the needle.

It will be obvious to those skilled in the art that various changes may be made without departing from the spirit of the invention and therefore the invention is not limited to what is shown in the drawings and described in the specification but only as indicated in the appended claims.

I claim:

1. A portable gas fuel lighter comprising a gaseous fuel supply means, a combustion chamber for burning a mixture of gas and air, ignition means adjacent said combustion chamber, a carbureting device connected to said combustion chamber for supplying a combustible gas and air mixture to said combustion chamber, a valve means connected to said carbureting device and said fuel supply means for supplying fuel to said carbureting device when open, a gear sector having a cam portion for opening said valve means, means to connect said cam portion and said valve means and a manually operated member having a rack portion meshing with said gear sector for rotating said cam portion to open said valve and a drive portion connected to said ignition means for initially opening said valve means and thereafter operating said ignition means.

2. A portable gas fuel lighter comprising a gaseous fuel supply means, a combustion chamber for burning a mixture of gas and air, ignition means adjacent said combustion chamber, a carbureting device connected to said combustion chamber for supplying a combustible gas and air mixture to said combustion chamber, a valve means connected to said carbureting device and said fuel supply means for supplying fuel to said carbureting device when open, a gear sector having a cam portion for opening said valve means, a valve operating lever having a first portion cooperating with said cam portion and a second portion extending laterally therefrom cooperating with said valve means, and a manually operated member having a rack portion meshing with said gear sector for rotating said cam portion to open said valve and a drive portion connected to said ignition means for initially opening said valve means and thereafter operating said ignition means.

3. A portable gas fuel lighter comprising a gaseous fuel supply means, a combustion chamber for burning a mixture of gas and air, ignition means adjacent said combustion chamber including a drive pinion, a carbureting device connected to said combustion chamber for supplying a combustible gas and air mixture to said combustion chamber, a valve means connected to said carbureting device and said fuel supply means for supplying fuel to said carbureting device when open, a gear sector having a cam portion for opening said valve means, means to connect said cam portion and said valve means and a manually operated member having a first rack portion meshing with said gear sector for rotating said cam portion to open said valve and a second rack portion meshing with said pinion for initially opening said valve means and thereafter operating said ignition means.

4. A portable gas fuel lighter comprising a gaseous fuel supply means, a combustion chamber for burning a mixture of gas and air, ignition means adjacent said combustion chamber including a drive pinion, a carbureting device connected to said combustion chamber for supplying a combustible gas and air mixture to said combustion chamber, a valve means connected to said carbureting device and said fuel supply means for supplying fuel to said carbureting device when open, a gear sector having a cam portion for opening said valve means, means to connect said cam portion and said valve means and a manually operated member having a first rack portion meshing with said gear sector for rotating said cam portion to open said valve and a second rack portion meshing with said pinion for initially opening said valve means and thereafter operating said ignition means and a second manually operated member having a rack thereon meshing with said pinion.

5. A portable gas fuel lighter comprising a casing, a combustion opening in said casing, a gaseous fuel supply means, a combustion chamber adjacent said combustion opening for burning a mixture of gas and air, ignition means adjacent said combustion chamber including a drive pinion, a carbureting device connected to said combustion chamber for supplying a combustible gas and air mixture to said combustion chamber, valve means connected to said carbureting device and said fuel supply means for supplying fuel to said carbureting device when open, a gear sector having a cam portion for opening said valve means, means to connect said cam portion and said valve means, a first manually operated member having a first rack portion meshing with said gear sector for rotating said cam portion to open said valve, a second rack portion meshing with said pinion and a closure member for said combustion opening and a second manually operated member having a rack thereon meshing with said pinion and a closure member for closing said combustion opening so that operation of said members will initially open said valve means and thereafter operate said ignition means and uncover said combustion opening.

6. A portable gas fuel lighter comprising a casing, a combustion opening in said casing, a gaseous fuel supply means in said casing, a combustion chamber adjacent said combustion opening for burning a mixture of gas and air, ignition means adjacent said combustion chamber, a carbureting device connected to said combustion chamber for supplying a combustible gas and air mixture to said combustion chamber, an air port in said casing adjacent said carbureting device, a valve means connected to said carbureting device and said fuel supply means for supplying fuel to said carbureting device when open, valve operating means cooperating with said valve means for opening the same upon actuation thereof and manually actuated means having a pair of closure members thereon covering said combustion opening and said air port, respectively, and having a direct driving connection with said valve operating means and said ignition means for initially operating said valve operating means and thereafter operating said ignition means and uncovering said combustion opening and said air port.

7. A portable gas fuel lighter comprising a gaseous fuel supply means, a combustion chamber for burning a mixture of gas and air, ignition means adjacent said combustion chamber, a carbureting device connected to said combustion chamber for supplying a combustible gas and air mixture to said combustion chamber, a screen member interposed between said carbureting device and said combustion chamber, a valve means connected to said carbureting device and said fuel supply means for supplying fuel to said carbureting device when open, valve operating means cooperating with said valve means for opening the same upon actuation thereof and manually actuated means having a direct driving connection with said valve operating means and said ignition means for initially operating said valve operating means and thereafter operating said ignition means.

8. A portable gas fuel lighter comprising a casing, a gaseous fuel supply means, a combustion chamber for burning a mixture of gas and air, ignition means adjacent said combustion chamber including a drive pinion, a carbureting device connected to said combustion chamber for supplying a combustible gas and air mixture to said combustion chamber, a valve means connected to said carbureting device and said fuel supply means for supplying fuel to said carbureting device when open, a gear sector having a cam portion for opening said valve means, means to connect said cam portion and said valve means, a manually operated member having a first rack portion meshing with said gear sector for rotating said cam portion to open said valve and a second rack portion meshing with said pinion for initially opening said valve means and thereafter operating said ignition means and a second manually operated member having a rack thereon meshing with said pinion, and a frame member in said casing provided with guide means for each of said manually operated members.

9. A portable gas fuel lighter comprising a casing, a gaseous fuel supply means, a combustion chamber for burning a mixture of gas and air, ignition means adjacent said combustion chamber including a drive pinion, a carbureting device connected to said combustion chamber for supplying a combustible gas and air mixture to said combustion chamber, a valve means connected to said carbureting device and said fuel supply means for supplying fuel to said carbureting device when open, a gear sector having a cam portion for opening said valve means, means to connect said cam portion and said valve means, a manually operated member having a first rack portion meshing with said gear sector for rotating said cam portion to open said valve and a second rack portion meshing with said pinion for initially opening said valve means and thereafter operating said ignition means and a second manually operated member having a rack thereon meshing with said pinion, and a frame member in said casing including a pair of cooperating members for supporting said valve means, one of said members being provided with guide means for said manually operated members.

10. A portable gas fuel lighter comprising a casing, a combustion chamber in said casing, pyrophoric ignition means in said casing adjacent said combustion chamber and including a flint and a flint spring cooperating therewith and a frame member composed of two mating parts for supporting said ignition means, each of said mating parts having an extended portion cooperating to form a guide tube for said spring and said flint.

11. A portable gas fuel lighter comprising a casing, a combustion chamber in said casing, a fuel cartridge in said casing connected to said combustion chamber for supplying fuel thereto, pyrophoric ignition means in said casing adjacent said combustion chamber and including a flint and a flint spring cooperating therewith and a frame member composed of two mating parts for supporting said ignition means, each of said mating parts having an extended portion cooperating to form a guide tube for said spring and said flint, said guide tube having a portion cooperating with said cartridge to properly position said cartridge in said casing.

12. A portable gas fuel lighter comprising a casing, a combustion chamber in said casing, a fuel cartridge in said casing connected to said combustion chamber for supplying fuel thereto, pyrophoric ignition means in said casing adjacent said combustion chamber and including a flint and a flint spring cooperating therewith, a frame member composed of two mating parts for supporting said ignition means, each of said mating parts having an extended portion cooperating to form a guide tube for said spring and said flint, said guide tube having a portion cooperating with said cartridge to properly position said cartridge in said casing, and a second guide means forming a part of said casing cooperating with said cartridge.

13. A portable gas fuel lighter comprising a casing, a combustion chamber in said casing, a fuel cartridge in said casing connected to said combustion chamber for supplying fuel thereto, pyrophoric ignition means in said casing adjacent said combustion chamber and including a flint and a flint spring cooperating therewith, a frame member composed of two mating parts for supporting said ignition means, each of said mating parts having an extended portion cooperating to form a guide tube for said spring and said flint, said guide tube having a portion cooperating wtih said cartridge to properly position said cartridge in said casing, a second guide means forming a part of said casing cooperating with said cartridge, and piercing means for said cartridge supported in said casing by said frame member.

References Cited in the file of this patent

UNITED STATES PATENTS

| | | |
|---|---|---|
| 1,508,600 | Guinn | Sept. 16, 1924 |
| 1,544,854 | Mueller et al. | July 7, 1925 |
| 1,844,481 | Rogers | Feb. 9, 1932 |
| 1,863,958 | Wulff et al. | June 21, 1932 |
| 2,153,432 | Reich | Apr. 4, 1939 |
| 2,454,501 | Camm | Nov. 23, 1948 |
| 2,482,794 | Peterson | Sept. 27, 1949 |
| 2,495,345 | Quercia et al. | Jan. 24, 1950 |
| 2,541,111 | Simon et al. | Feb. 13, 1951 |